(12) United States Patent
Saito et al.

(10) Patent No.: US 11,648,586 B2
(45) Date of Patent: May 16, 2023

(54) VIBRATION DEVICE

(71) Applicant: TDK CORPORATION, Tokyo (JP)

(72) Inventors: Kazuki Saito, Tokyo (JP); Kaoru Kijima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 363 days.

(21) Appl. No.: 17/004,414

(22) Filed: Aug. 27, 2020

(65) Prior Publication Data
US 2021/0060612 A1    Mar. 4, 2021

(30) Foreign Application Priority Data

Aug. 30, 2019   (JP) .............................. JP2019-158499

(51) Int. Cl.
*B06B 1/06*      (2006.01)
*G06F 3/01*      (2006.01)

(52) U.S. Cl.
CPC ............ *B06B 1/0651* (2013.01); *G06F 3/016* (2013.01)

(58) Field of Classification Search
CPC .................................................. B06B 1/0651
See application file for complete search history.

(56) References Cited

U.S. PATENT DOCUMENTS

| | | | | |
|---|---|---|---|---|
| 2012/0247217 A1* | 10/2012 | Suzuki | ..................... | G01L 11/06 29/25.35 |
| 2015/0165479 A1* | 6/2015 | Lasiter | ............... | H10N 30/2047 29/25.35 |
| 2015/0188455 A1* | 7/2015 | Oh | ........................ | H10N 30/204 310/317 |
| 2015/0276504 A1* | 10/2015 | Yanata | ............... | H03H 9/02102 374/152 |
| 2016/0193835 A1* | 7/2016 | Togashi | ............... | B41J 2/14233 29/890.1 |
| 2016/0221339 A1* | 8/2016 | Togashi | ............... | B41J 2/14233 |

FOREIGN PATENT DOCUMENTS

JP        2013-243501 A    12/2013

* cited by examiner

*Primary Examiner* — Bryan P Gordon
(74) *Attorney, Agent, or Firm* — Oliff PLC (57) ABSTRACT

A vibration device includes a piezoelectric element and a vibration member. The vibration device is arranged to be supported on a base. The vibration member includes a first main surface opposing the base and a second main surface opposing the first main surface. The piezoelectric element is disposed on the second main surface. The first main surface of the vibration member is provided with a protrusion contacting the base and defining a vibration space on the first main surface. The protrusion is positioned outside the piezoelectric element to surround the piezoelectric element when the vibration member is seen through from a direction orthogonal to the first main surface.

11 Claims, 8 Drawing Sheets

VIBRATION DEVICE

BACKGROUND OF THE INVENTION

1. Field of the Invention

One aspect of the present invention relates to a vibration device.

2. Description of Related Art

A known vibration device is supported on a base (see, for example, Japanese Unexamined Patent Publication No. 2013-243501). The vibration device includes a piezoelectric element and a vibration member. The vibration member includes a first main surface opposing the base and a second main surface opposing the first main surface. The piezoelectric element is disposed on the second main surface.

SUMMARY OF THE INVENTION

In the vibration device described in Japanese Unexamined Patent Publication No. 2013-243501, the entire vibration member is supported on the base. In this case, the base may prevent the vibration member from being displaced. In other words, the base may inhibit displacement of the vibration member. The displacement of the vibration device decreases in a case where the base inhibits displacement of the vibration member.

An object of one aspect of the present invention is to provide a vibration device controlling a decrease in displacement.

A vibration device according to one aspect is arranged to be supported on a base. The vibration device includes a piezoelectric element and a vibration member. The vibration member includes a first main surface opposing the base and a second main surface opposing the first main surface. The piezoelectric element is disposed on the second main surface. The first main surface of the vibration member is provided with a protrusion contacting the base and defining a vibration space on the first main surface. The protrusion is positioned outside the piezoelectric element to surround the piezoelectric element when the vibration member is seen through from a direction orthogonal to the first main surface.

In the one aspect, the protrusion contacts the base, and thus the vibration device is arranged to be supported on the base at the protrusion. In other words, a unit including the piezoelectric element and the vibration member is supported on the base with the protrusion. Therefore, in the one aspect, the base tends not to prevent the vibration member from being displaced as compared with in a configuration in which the entire vibration member is supported on the base. In other words, the base tends not to inhibit displacement of the vibration device. Consequently, the displacement of the vibration device tends not to decrease. The one aspect controls a decrease in the displacement.

The protrusion is positioned outside the piezoelectric element to surround the piezoelectric element when the vibration member is seen through from the direction orthogonal to the first main surface. In this configuration, the displacement of the vibration device is large as compared with in a configuration in which the protrusion is positioned inside an outer edge of the piezoelectric element when the vibration member is seen through from the direction orthogonal to the first main surface. Therefore, the one aspect further controls a decrease in the displacement.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Hereinafter, embodiments of the present invention will be described in detail with reference to the accompanying drawings. In the following description, the same elements or elements having the same functions are denoted with the same reference numerals and overlapped explanation is omitted.

Figure 1:
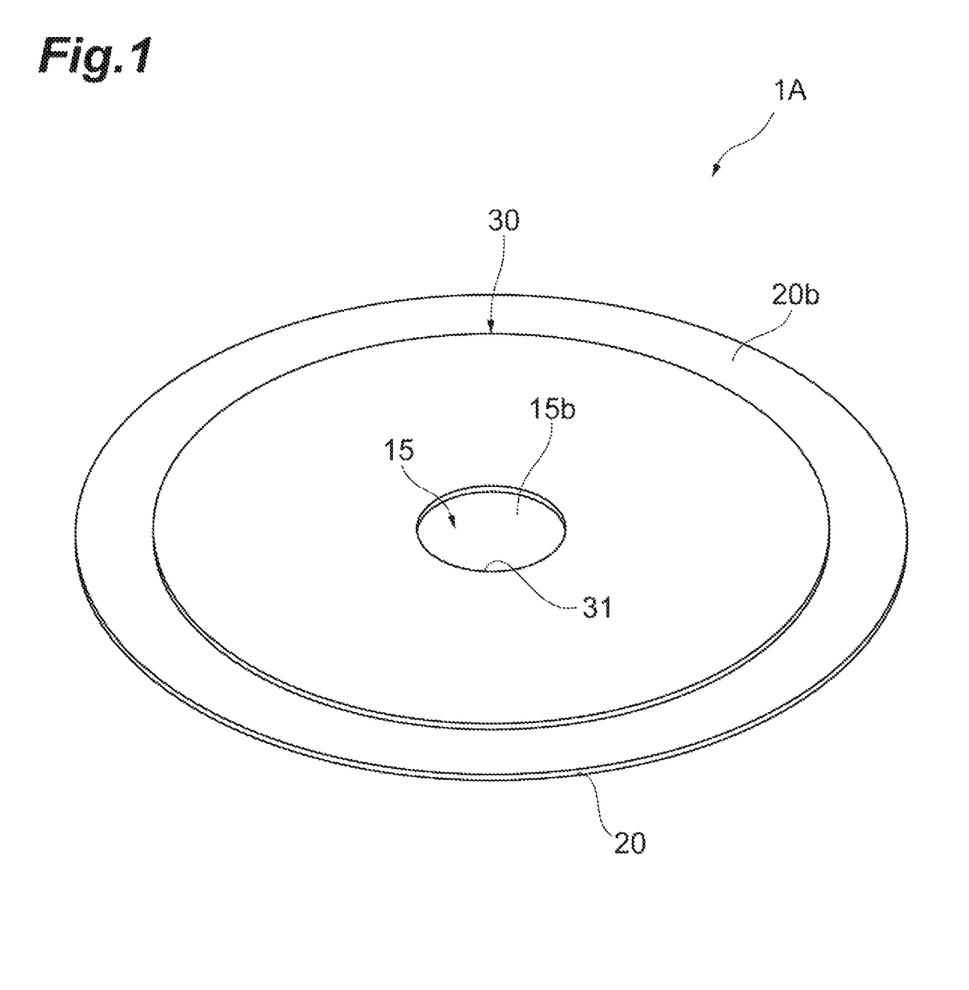
FIG. 1 is a perspective view illustrating a vibration device according to an embodiment.
Figure 2:
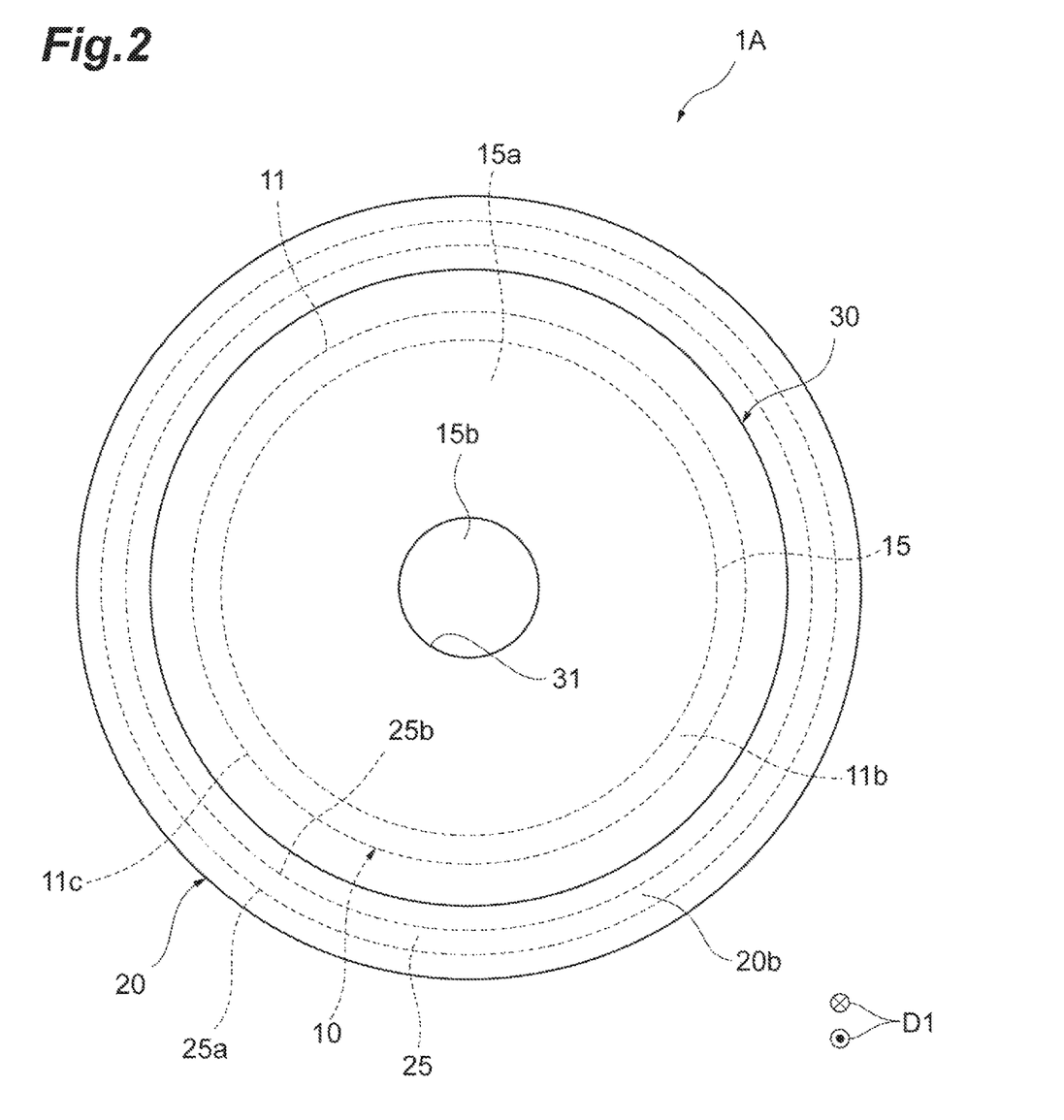
FIG. 2 is a plan view illustrating the vibration device according to the embodiment.
Figure 3:
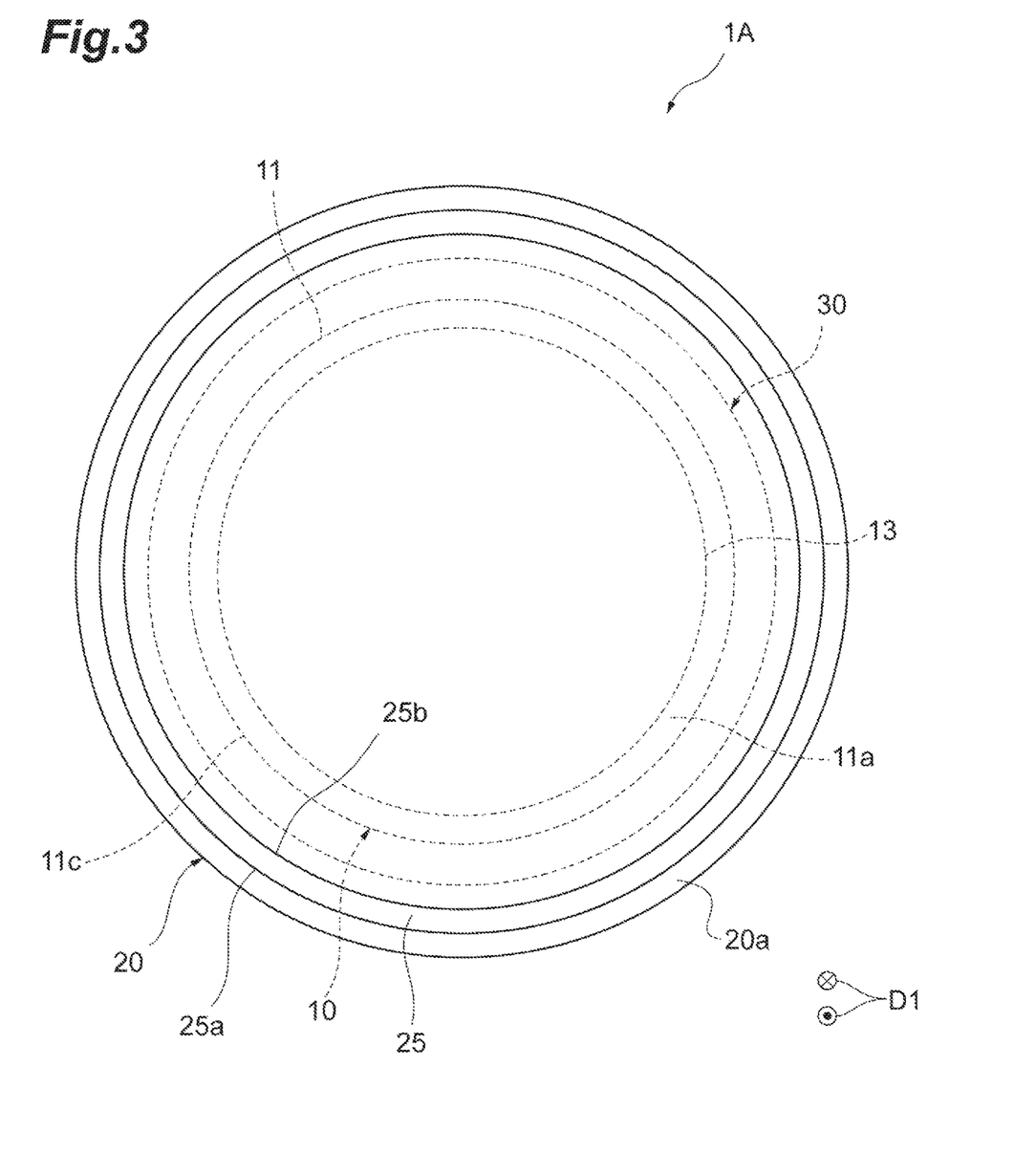
FIG. 3 is a plan view illustrating the vibration device according to the embodiment.
Figure 4:
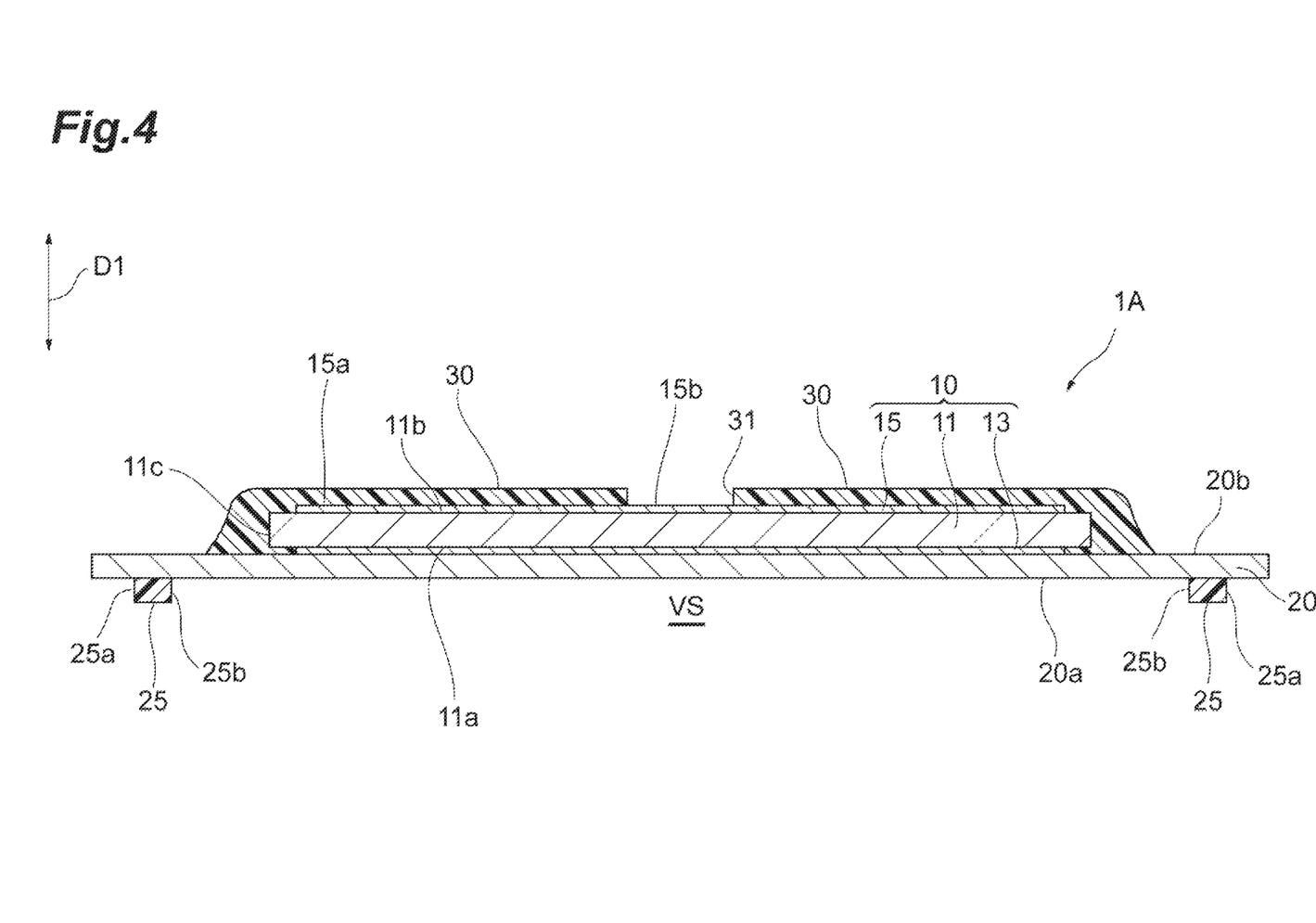
FIG. 4 is a diagram illustrating a cross-sectional configuration of the vibration device according to the embodiment.
Figure 5:
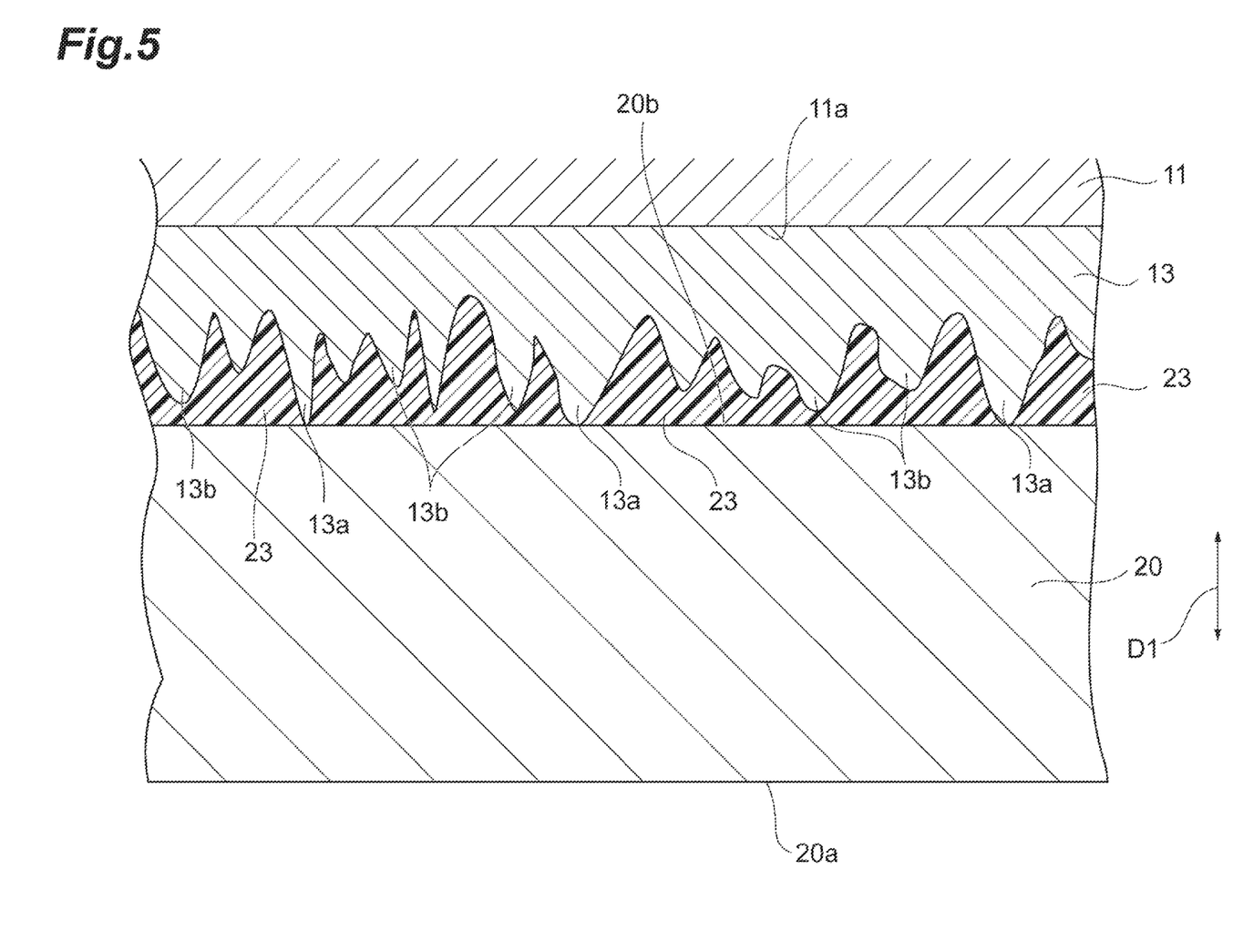
FIG. 5 is a diagram illustrating a cross-sectional configuration of the vibration device according to the embodiment.
Figure 6:
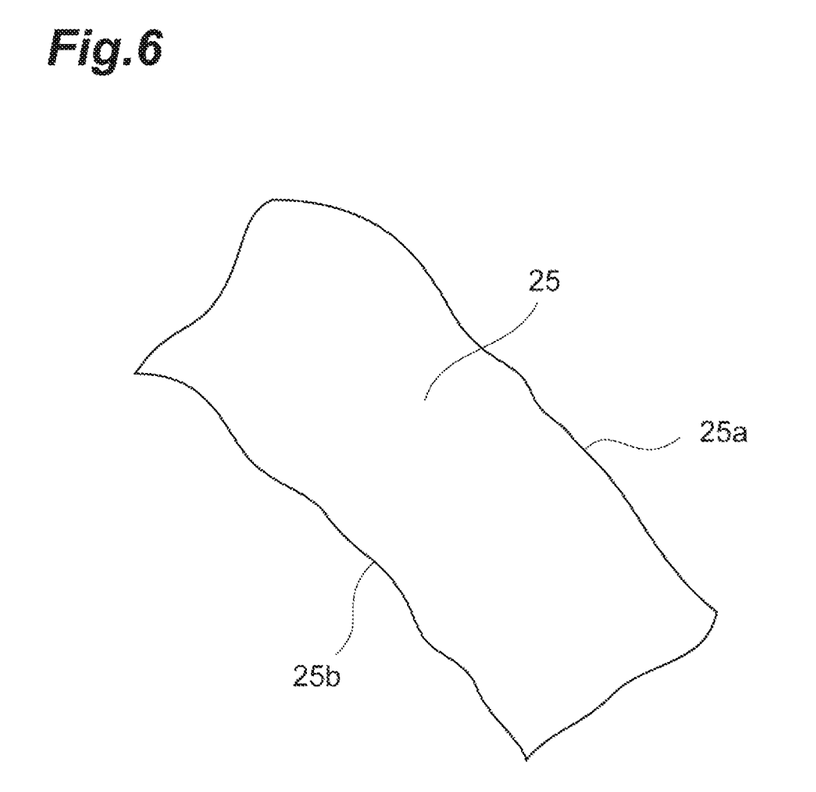
FIG. 6 is a plan view illustrating a protrusion.

A configuration of a vibration device 1A according to an embodiment will be described with reference to FIGS. 1 to 6. FIG. 1 is a perspective view illustrating the vibration device according to the embodiment. FIGS. 2 and 3 are plan views illustrating the vibration device according to the embodiment. FIGS. 4 and 5 are diagrams illustrating a cross-sectional configuration of the vibration device according to the embodiment. FIG. 6 is a plan view illustrating a protrusion.

As illustrated in FIGS. 1 to 4, the vibration device 1A includes a piezoelectric element 10, a vibration member 20, and a protective layer 30. The piezoelectric element 10 includes a piezoelectric element body 11 and a pair of external electrodes 13 and 15. In the embodiment, the piezoelectric element 10 includes no internal electrode disposed in the piezoelectric element body 11.

The piezoelectric element body 11 has a disk shape. The piezoelectric element body 11 includes a pair of main surfaces 11a and 11b opposing each other and a side surface 11c. The shape and area of the main surface 11a and the shape and area of the main surface 11b are substantially identical. The main surfaces 11a and 11b have a circular shape. In the embodiment, each of the main surfaces 11a and 11b has a generally perfect circular shape. For example, the main surface 11b constitutes a fourth main surface in a case where the main surface 11a constitutes a third main surface. The diameter of the main surfaces 11a and 11b is, for example, 5 to 20 mm. In the embodiment, a diameter of the main surfaces 11a and 11b is 10 mm.

The direction in which the main surface 11a and the main surface 11b oppose each other is a first direction D1. The first direction D1 is orthogonal to the main surfaces 11a and 11b. The side surface 11c extends in the first direction D1 to couple the main surface 11a and the main surface 11b. The main surfaces 11a and 11b and the side surface 11c are indirectly adjacent to each other via a ridge portion. A length of the piezoelectric element body 11 in the first direction D1 (thickness of the piezoelectric element body 11) is, for example, 40 to 300 µm. In the embodiment, the thickness of the piezoelectric element body 11 is 140 µm.

The piezoelectric element body 11 is made of a piezoelectric material. In the embodiment, the piezoelectric element body 11 contains a piezoelectric ceramic material. The piezoelectric ceramic material includes, for example, PZT [Pb(Zr,Ti)O$_3$], PT (PbTiO$_3$), PLZT [(Pb,La)(Zr,Ti)O$_3$], or barium titanate (BaTiO$_3$). The piezoelectric element body 11 includes, for example, a sintered body of a ceramic green sheet containing the piezoelectric ceramic material described above.

The external electrode 13 is disposed on the main surface 11a. The external electrode 13 is in contact with the main surface 11a. The external electrode 15 is disposed on the main surface 11b. The external electrode 15 is in contact with the main surface 11b. Each of the external electrodes 13 and 15 has a circular shape when viewed from the first direction D1. A surface of each of the external electrodes 13 and 15 has a circular shape. In the embodiment, each of the external electrodes 13 and 15 (the surface of each of the external electrodes 13 and 15) has a generally perfect circular shape. Each of the external electrodes 13 and 15 is made of an electrically conductive material. The electrically conductive material includes, for example, Ag, Pd, or an Ag—Pd alloy. Each of the external electrodes 13 and 15 is configured as a sintered body of electrically conductive paste containing the electrically conductive material described above. No electrode is disposed on the side surface 11c of the piezoelectric element body 11. Therefore, the entire side surface 11c is exposed without being covered with an electrode. For example, the external electrode 15 constitutes a second electrode in a case where the external electrode 13 constitutes a first electrode.

The external electrode 13 covers a part of the main surface 11a. An area of the external electrode 13 is smaller than an area of the main surface 11a when viewed from the first direction D1. The external electrode 13 is positioned inside an end edge of the main surface 11a when viewed from the first direction D1. The external electrode 13 is separated from the end edge of the main surface 11a. The main surface 11a includes a region covered with the external electrode 13 and a region exposed from the external electrode 13. The region covered with the external electrode 13 is positioned inside the region exposed from the external electrode 13 and is surrounded by the region exposed from the external electrode 13 when viewed from the first direction D1. The external electrode 13 may cover the entire main surface 11a.

The external electrode 15 covers a part of the main surface 11b. An area of the external electrode 15 is smaller than an area of the main surface 11b when viewed from the first direction D1. The external electrode 15 is positioned inside an end edge of the main surface 11b when viewed from the first direction D1. The external electrode 15 is separated from the end edge of the main surface 11b. The main surface 11b includes a region covered with the external electrode 15 and a region exposed from the external electrode 15. The region covered with the external electrode 15 is positioned inside the region exposed from the external electrode 15 and is surrounded by the region exposed from the external electrode 15 when viewed from the first direction D1. The external electrode 15 may cover the entire main surface 11b.

The vibration member 20 includes a pair of main surfaces 20a and 20b opposing each other. The direction in which the main surface 20a and the main surface 20b oppose each other is also the first direction D1. The first direction D1 is also orthogonal to the main surfaces 20a and 20b. The vibration member 20 is a plate-shaped member. In the embodiment, the vibration member 20 is a vibration plate. In this case, the vibration member 20 amplifies vibration of the piezoelectric element 10. The vibration member 20 is made of, for example, metal. The vibration member 20 is made of, for example, a Ni—Fe alloy, Ni, brass, or stainless steel. The vibration member 20 has electrically conductivity. Therefore, each of the main surfaces 20a and 20b also has electrically conductivity.

The vibration member 20 (each of main surfaces 20a and 20b) has a circular shape when viewed from the first direction D1. In the embodiment, the vibration member 20 (each of main surfaces 20a and 20b) has a generally perfect circular shape. A length of the vibration member 20 in the first direction D1 (thickness of the vibration member 20) is, for example, 50 to 300 µm. In the embodiment, the thickness of the vibration member 20 is 120 µm. A diameter of the main surfaces 20a and 20b is, for example, 8 to 30 mm. In the embodiment, the diameter of the main surfaces 20a and 20b is 15 mm. For example, the main surface 20b constitutes a first main surface in a case where the main surface 20a constitutes a second main surface.

The piezoelectric element 10 and the vibration member 20 are joined by a resin layer 23 as illustrated in FIG. 5. The resin layer 23 joins the external electrode 13 and the main surface 20a of the vibration member 20. The piezoelectric element 10 is disposed on the vibration member 20 such that the external electrode 13 and the main surface 20a oppose each other. The external electrode 13 and the main surface 20a oppose each other with the resin layer 23 present between the external electrode 13 and the main surface 20a. The external electrode 13 and the main surface 20a indirectly oppose each other. The resin layer 23 includes, for example, thermosetting resin, photocurable resin, or photocurable and thermosetting resin. The resin layer 23 includes, for example, epoxy resin, acrylic resin, or urethane resin.

An area of the piezoelectric element 10 (each of main surfaces 11a and 11b) is smaller than an area of the vibration member 20 (each of main surfaces 20a and 20b) when viewed from the first direction D1. The piezoelectric element 10 is positioned inside an outer edge of the vibration member 20 (main surface 20a) when viewed from the first direction D1. The piezoelectric element 10 is positioned substantially in a middle of the main surface 20a of the vibration member 20 when viewed from the first direction D1. The substantially middle of the main surface 20a includes not only a center position of the main surface 20a but also a position separated from the center position of the main surface 20a due to a manufacturing error or tolerance. In addition, the substantially middle of the main surface 20a includes a position separated by a predetermined minute length from the center of the main surface 20a. The predetermined length is, for example, 5% of a radius of the main surface 20a.

The external electrode 13 and the main surface 20a are in physical contact with each other and electrically connected to each other as illustrated in FIG. 5. The external electrode 13 includes a plurality of protrusions 13a. The plurality of protrusions 13a are in physical contact with the main surface 20a. The external electrode 13 and the main surface 20a are electrically connected to each other via the plurality of protrusions 13a. Each protrusion 13a constitutes an electrical connection path between the external electrode 13 and the main surface 20a. The main surface 20a is generally flat. A thickness of the external electrode 13 is the largest at a position of the protrusion 13a. The maximum thickness of the external electrode 13 is, for example, 5 to 10 µm. In the embodiment, the maximum thickness of the external electrode 13 is 8 µm. The minimum thickness of the external electrode 13 is, for example, 1 to 5 µm. In the embodiment, the minimum thickness of the external electrode 13 is 2 µm. The average thickness of the external electrode 13 is, for example, 4 to 7 µm. In the embodiment, the average thickness of the external electrode 13 is 5 µm.

The external electrode 13 also includes a plurality of protrusions 13b that are not in physical contact with the main surface 20a. The plurality of protrusions 13b are separated from the main surface 20a and are not in physical contact with the main surface 20a. Irregular asperity is formed on the surface of the external electrode 13 due to the protrusions 13a and 13b. The Irregular asperity refers to at least either a state where intervals of peaks of the asperity irregularly change, or a state where height differences of the asperity irregularly change. Irregular asperity may also be formed on the surface of the external electrode 15 similarly to the external electrode 13.

Figure 8:
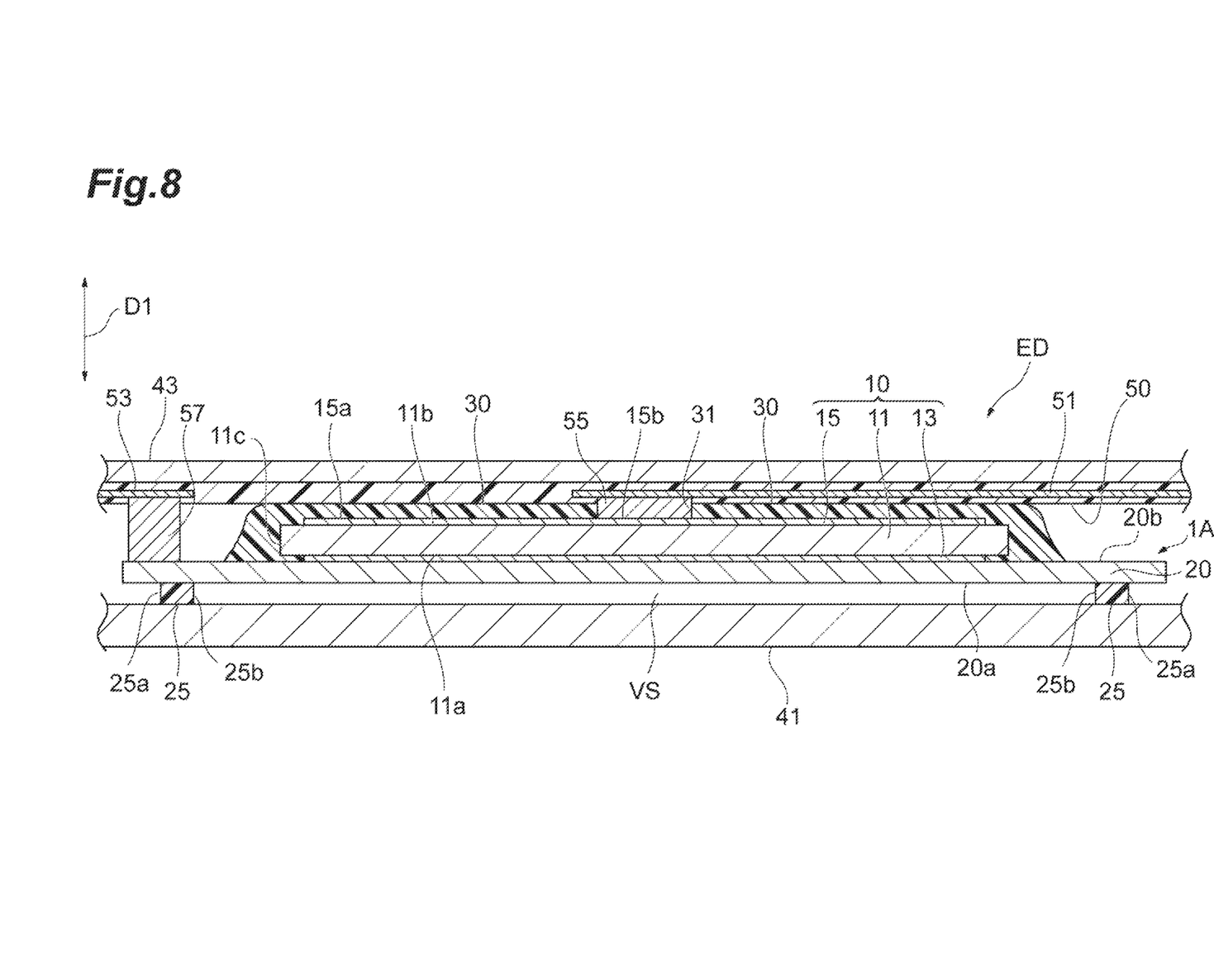
FIG. 8 is a diagram illustrating a cross-sectional configuration of an electronic device according to the embodiment.

The resin layer 23 is positioned between the plurality of protrusions 13a. The resin layer 23 is also positioned between the plurality of protrusions 13b and the main surface 20a in the first direction D1. A thickness of the resin layer 23 changes in correspondence with the shapes of the protrusions 13a and 13b. FIGS. 4 and 8 do not illustrate the resin layer 23 to simplify the drawings.

A protrusion 25 is provided on the main surface 20a of the vibration member 20. The protrusion 25 is disposed on the main surface 20a. The protrusion 25 defines a vibration space VS on the main surface 20a. The vibration space VS is positioned inside the protrusion 25 when viewed from the first direction D1. As illustrated in FIGS. 2 and 3, the protrusion 25 is positioned outside the piezoelectric element 10 to surround the piezoelectric element 10 when the vibration member 20 is seen through from the first direction D1. The protrusion 25 does not overlap the piezoelectric element 10 when the vibration member 20 is seen through from the first direction D1. The protrusion 25 is positioned outside the outer edge of the piezoelectric element 10 when the vibration member 20 is seen through from the first direction D1. The protrusion 25 is positioned inside an end edge of the vibration member 20 (main surface 20a) when viewed from the first direction D1. The protrusion 25 is separated from the end edge of the vibration member 20 (main surface 20a) when viewed from the first direction D1.

The protrusion 25 has an annular shape when viewed from the first direction D1. Therefore, the protrusion 25 is continuously formed to surround the entire circumference of the piezoelectric element 10 when the vibration member 20 is seen through from the first direction D1. In the embodiment, the protrusion 25 has a generally circular annular shape. The protrusion 25 is formed due to, for example, a resin material being solidified. In this case, the protrusion 25 is made of, for example, phenolic resin, acrylic resin, polyvinyl acetal resin, polyurethane resin, polyamide resin, epoxy resin, styrene resin, or polyester resin. The protrusion 25 may be made of metal. In this case, the protrusion 25 may be made of the same type of metal as the vibration member 20 or may be made of a metal different from that of the vibration member 20. The protrusion 25 may be configured integrally with the vibration member 20 or may be configured separately from the vibration member 20. In a case where the protrusion 25 is configured separately from the vibration member 20, the protrusion 25 includes a surface that is in contact with the vibration member 20 (main surface 20a).

The protrusion 25 includes an outer edge 25a and an inner edge 25b. As illustrated in FIG. 5, the outer edge 25a and the inner edge 25b have a wavy shape when viewed from the first direction D1. The wavy shape includes a shape in which peaks and bottoms are regularly or irregularly repeated. The wavy shape may include a shape in which a width of the protrusion 25 changes regularly or irregularly along a direction in which the protrusion 25 extends. A part of the outer edge 25a may have a wavy shape or the entire outer edge 25a may have a wavy shape. A part of the inner edge 25b may have a wavy shape or the entire inner edge 25b may have a wavy shape. In a case where a part of the outer edge 25a and a part of the inner edge 25b are wavy, the positions of the wavy parts of the outer edge 25a and the inner edge 25b may be the same or different in the direction in which the protrusion 25 extends.

The width of the protrusion 25 is, for example, 0.1 to 1.5 mm. In the embodiment, the width is approximately 1 mm A height of the protrusion 25 is, for example, 50 to 500 µm. In the embodiment, the height is approximately 250 µm. A distance (shortest distance) between the protrusion 25 and the end edge of the vibration member 20 (main surface 20a) is, for example, 0 to 2 mm. In the embodiment, the distance is approximately 0.5 mm.

The protective layer 30 is disposed to cover the piezoelectric element 10. The protective layer 30 is made of electrically insulating resin. In other words, the protective layer 30 contains no electrically conductive filler. The protective layer 30 is formed due to a resin material being solidified. The protective layer 30 is made of, for example, polyvinyl butyral resin, acrylic resin, or polyurethane resin.

An opening 31 is formed in the protective layer 30. A part of the external electrode 15 is exposed from the opening 31. The surface of the external electrode 15 includes a region 15a covered with the protective layer 30 and a region 15b exposed from the protective layer 30. The region 15b is positioned to be surrounded by the region 15a when viewed from the first direction D1. An inner edge of the protective layer 30 defines the region 15b. The inner edge of the protective layer 30 defines the opening 31. The shape of the region 15b is defined by the shape of the opening 31. In the embodiment, the region 15b has a generally circular shape. The piezoelectric element 10 is substantially entirely covered with the protective layer 30 except for the region 15b.

The region 15b is positioned substantially in the middle of the surface of the external electrode 15 when viewed from the first direction D1. The substantially middle of the surface of the external electrode 15 includes not only a center position of the surface but also a position separated from the center position of the surface due to a manufacturing error or a tolerance. The substantially middle of the surface of the external electrode 15 also includes a position separated by a predetermined minute length from the center of the surface. The predetermined length is, for example, 10% of a radius of the surface of the external electrode 15. The region 15b may be separated from the substantially middle of the surface of the external electrode 15 when viewed from the first direction D1.

Figure 7:
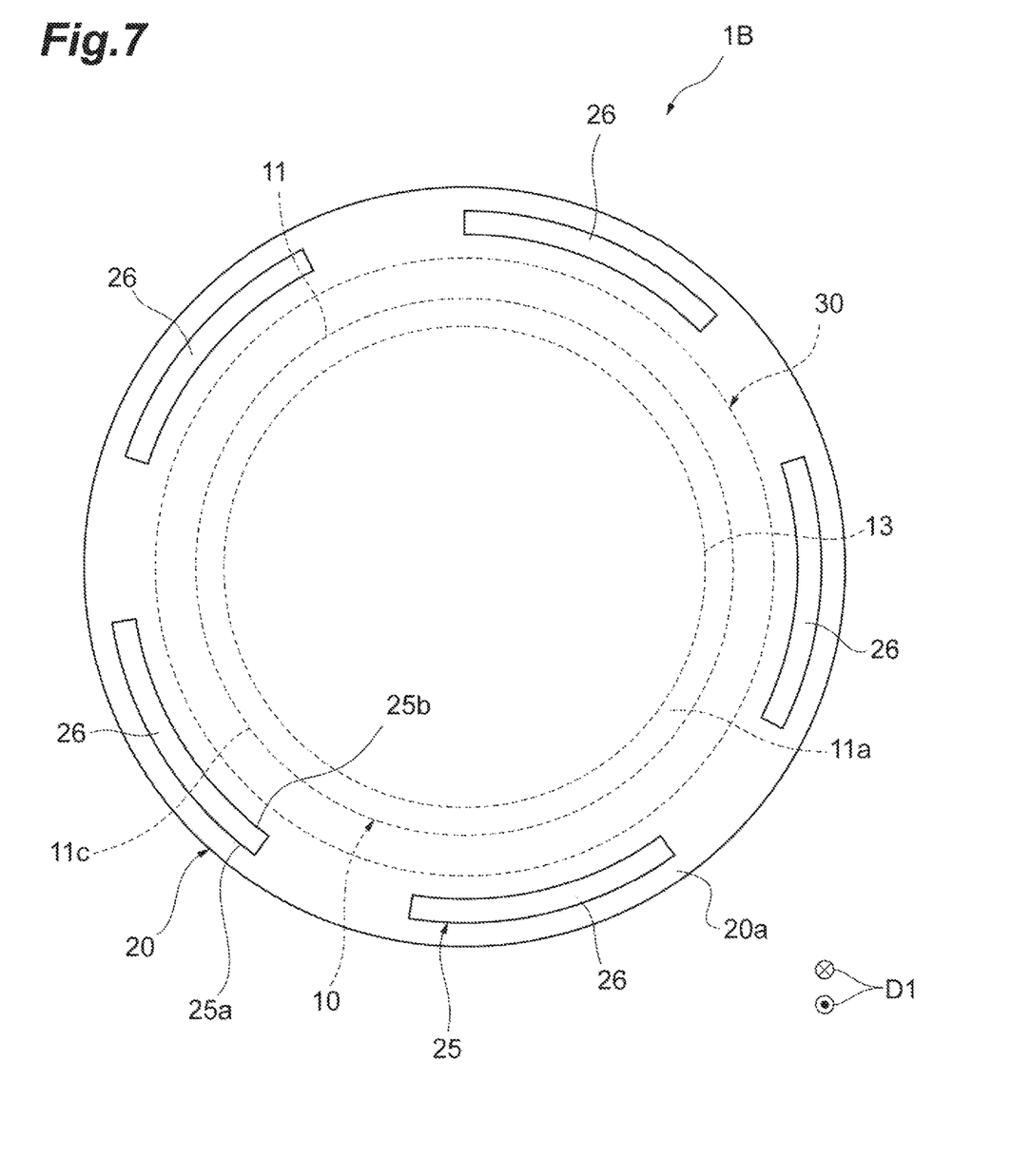
FIG. 7 is a plan view illustrating a vibration device according to a modification of the embodiment.

Next, a configuration of a vibration device 1B according to a modification of the embodiment will be described with reference to FIG. 7. FIG. 7 is a plan view illustrating the vibration device according to the modification of the embodiment. Although the vibration device 1B according to the modification is generally similar or identical to the vibration device 1A described above, the modification is different from the embodiment described above with regard to the configuration of the protrusion 25. Hereinafter, the difference between the embodiment described above and the modification will be mainly described.

The vibration device 1B includes the piezoelectric element 10, the vibration member 20, and the protective layer 30 (not illustrated) as in the case of the vibration device 1A. The protrusion 25 provided on the main surface 20a of the vibration member 20 is intermittently provided. In other words, the protrusion 25 is intermittently formed to surround the piezoelectric element 10 when the vibration member 20 is seen through from the first direction D1. The protrusion 25 is intermittently disposed on the main surface 20a. In the modification, the protrusion 25 includes a plurality of portions 26. In the embodiment, the protrusion 25 includes five portions 26. The portions 26 are separated from each other on the main surface 20a. Each portion 26 has a generally arc shape when viewed from the first direction D1. The protrusion 25 may include four or less portions 26 or may include six or more portions 26.

The plurality of parts 26 define the vibration space VS on the main surface 20a. As illustrated in FIG. 7, the plurality of parts 26 are positioned outside the piezoelectric element 10 to surround the piezoelectric element 10 when the vibration member 20 is seen through from the first direction D1. The plurality of parts 26 do not overlap the piezoelectric element 10 when the vibration member 20 is seen through from the first direction D1. The plurality of parts 26 are positioned inside the end edge of the vibration member 20 (main surface 20a) when viewed from the first direction D1. The plurality of parts 26 are separated from the end edge of the vibration member 20 (main surface 20a) when viewed from the first direction D1.

Next, a configuration of an electronic device ED according to the embodiment will be described with reference to FIG. 8. FIG. 8 is a diagram illustrating a cross-sectional configuration of the electronic device according to the embodiment.

As illustrated in FIG. 8, the electronic device ED includes a base 41, an operation panel 43, the vibration device 1A, and a wiring member 50. The electronic device ED may include the vibration device 1B instead of the vibration device 1A. The vibration device 1A is disposed between the base 41 and the operation panel 43. The vibration device 1A vibrates the operation panel 43. The operation panel 43 vibrates relative to the base 41. The operation panel 43 constitutes, for example, a vibrated member.

The wiring member 50 is electrically connected to the piezoelectric element 10. The wiring member 50 is disposed between the operation panel 43 and the vibration device 1A. The wiring member 50 is disposed in the vibration device 1A to oppose the piezoelectric element 10. The wiring member 50 and the piezoelectric element 10 oppose each other with the protective layer 30 present between the wiring member 50 and the piezoelectric element 10. The wiring member 50 and the piezoelectric element 10 indirectly oppose each other. The wiring member 50 is in contact with the operation panel 43. The wiring member 50 is, for example, a flexible printed circuit (FPC).

The wiring member 50 includes a plurality of lines 51 and 53. In the embodiment, the wiring member 50 includes two lines 51 and 53. The line 51 is electrically connected to the external electrode 15. The line 51 is electrically and physically connected to the external electrode 15 via an electrically conductive resin 55. The electrically conductive resin 55 is disposed between the line 51 and the external electrode 15 (region 15b) and is in contact with the line 51 and the external electrode 15 (region 15b). The line 53 is electrically connected to the main surface 20b of the vibration member 20. The line 53 is electrically and physically connected to the main surface 20b via an electrically conductive resin 57. The electrically conductive resin 57 is disposed between the line 53 and the main surface 20a and is in contact with the line 53 and the main surface 20b. The line 53 is electrically connected to the external electrode 13 via the electrically conductive resin 57 and the vibration member 20. The electrically conductive resins 55 and 57 include, for example, resin and an electrically conductive filler. The resin is, for example, thermosetting resin. The electrically conductive filler is, for example, metal particles or metal plating particles. The metal particles are, for example, Ag particles or Cu particles. The metal plating particles are, for example, gold plating particles. The thermosetting resin is, for example, phenolic resin, acrylic resin, silicone resin, epoxy resin, or polyimide resin.

The vibration device 1A is disposed on the base 41 such that the main surface 20a of the vibration member 20 opposes the base 41. The protrusion 25 contacts the base 41. In the electronic device ED, the protrusion 25 contacts the base 41 directly. A thickness of the vibration space VS, that is, a length of the vibration space VS in the first direction D1 is defined by the height of the protrusion 25. In the electronic device ED, the vibration space VS is defined by the vibration member 20 (main surface 20a), the protrusion 25, and the base 41. The thickness of the vibration space VS is larger than displacement of the vibration member 20. The displacement of the vibration member 20 is the half amplitude of the vibration of the vibration member 20, that is, 50% of the total amplitude of the vibration of the vibration member 20.

The vibration device 1A and the wiring member 50 are sandwiched between the base 41 and the operation panel 43. Consequently, the vibration device 1A is supported on the base 41 at the protrusion 25. A vibration unit that includes the piezoelectric element 10 and the vibration member 20 is supported on the base 41 with the protrusion 25. In the embodiment, the protrusion 25 is not fixed to the base 41 and the wiring member 50 is not fixed to the operation panel 43. The wiring member 50 may be fixed to the operation panel 43.

The lines 51 and 53 are connected to a control unit (not illustrated). The control unit is electrically connected to the piezoelectric element 10 via the wiring member 50 and controls the vibration device 1A as a whole. The control unit includes, for example, a central processing unit (CPU), a read only memory (ROM), and a random access memory (RANI). In this case, the control unit performs various types of processing by loading a program stored in the ROM into the RANI and executing the program with the CPU.

The vibration unit including the piezoelectric element 10 and the vibration member 20 is supported on the base 41 with the protrusion 25. Therefore, the piezoelectric element 10 is used in a bendable state together with the vibration member 20. For example, the piezoelectric element 10 provides a detection signal to the control unit when a fingertip of a user of the electronic device ED comes into contact with the operation panel 43 and the piezoelectric element 10 is bent. Upon receiving the detection signal, the control unit provides a drive signal to the piezoelectric element 10 to drive the piezoelectric element 10. The piezoelectric element 10 vibrates in response to the drive signal. The piezoelectric element 10 constitutes a detection element and a drive element.

The control unit applies alternating current voltages having different polarities to the external electrodes 13 and 15 as the drive signal via the lines 51 and 53 of the wiring member 50. An electric field is generated between the external electrode 13 and the external electrode 15 when the alternating current voltages having the different polarities are applied to the external electrodes 13 and 15. A region of the piezoelectric element body 11 that is sandwiched between the external electrode 13 and the external electrode 15 becomes an active region, and displacement occurs in the active region. The piezoelectric element 10 repeats expansion and contraction in response to the frequency of the alternating current voltage.

Since the piezoelectric element 10 and the vibration member 20 are joined to each other, the vibration member 20 flexurally vibrates integrally with the piezoelectric element 10 in response to repeated expansion and contraction of the piezoelectric element 10. Consequently, the vibration device 1A gives the user a tactile sensation. The tactile sensation is, for example, a click tactile sensation. The click tactile sensation is, for example, a touch tactile sensation or a pressing tactile sensation obtained when a push button switch is pressed.

As described above, the vibration devices 1A and 1B include the piezoelectric element 10 and the vibration member 20. The protrusion 25 provided on the main surface 20a of the vibration member 20 contacts the base 41 and defines the vibration space VS on the main surface 20a.

In the vibration devices 1A and 1B, the protrusion 25 contacts the base 41, and thus the vibration devices 1A and 1B are supported on the base 41 at the protrusion 25. In other words, the vibration unit including the piezoelectric element 10 and the vibration member 20 is supported on the base 41 with the protrusion 25. Therefore, in the vibration devices 1A and 1B, the base 41 tends not to prevent the vibration member 20 from being displaced as compared with in a configuration in which the entire vibration member 20 is supported on the base 41. In other words, the base 41 tends not to inhibit the displacement of the vibration devices 1A and 1B although the vibration devices 1A and 1B are supported on the base 41. Consequently, the displacement of the vibration devices 1A and 1B tends not to decrease. The vibration devices 1A and 1B control a decrease in the displacement. In the embodiments, the vibration devices 1A and 1B are arranged to be supported on the base 41.

The protrusion 25 is positioned outside the piezoelectric element 10 to surround the piezoelectric element 10 when the vibration member 20 is seen through from the first direction D1. In this configuration, the displacement of the vibration devices 1A and 1B is large as compared with in a configuration in which the protrusion 25 is positioned inside the outer edge of the piezoelectric element 10 when the vibration member 20 is seen through from the first direction D1. Therefore, the vibration devices 1A and 1B further control a decrease in the displacement.

In the vibration devices 1A and 1B, the protrusion 25 is positioned inside the end edge of the vibration member 20 (main surface 20a) when viewed from the first direction D1. In this case, the vibration devices 1A and 1B produce the following effects.

In a configuration in which the protrusion 25 made of an electrically insulating material is positioned at the end edge of the vibration member 20, the electrically insulating material constituting the protrusion 25 may adhere to the main surface 20b when forming the protrusion 25. The electrically insulating material is, for example, resin containing no electrically conductive filler. The adhesion of the electrically insulating material constituting the protrusion 25 to the main surface 20b may inhibit electrical connection between the line 53 and the main surface 20b. In contrast, in the vibration devices 1A and 1B, the electrically insulating material constituting the protrusion 25 tends not to adhere to the main surface 20b. Therefore, the vibration devices 1A and 1B satisfactorily establish electrical connection between the line 53 and the main surface 20b.

In a configuration in which the protrusion 25 made of metal is positioned at the end edge of the vibration member 20, the end edge of the vibration member 20 may be distorted when forming the protrusion 25. The vibration member 20 may not appropriately vibrate due to the distortion of the end edge of the vibration member 20. The end edge of the vibration member 20 further tends to be distorted in a case where the protrusion 25 is formed integrally with the metallic vibration member 20. In contrast, in the vibration devices 1A and 1B, the end edge of the vibration member 20 tends not to be distorted. Therefore, the vibration member 20 appropriately vibrates in the vibration devices 1A and 1B.

In the vibration devices 1A and 1B, the thickness of the vibration space VS is larger than the displacement of the vibration member 20. Therefore, the vibration member 20 tends not to come into contact with the base 41 even in a case where the vibration member 20 vibrates. Consequently, the base 41 tends not to inhibit the vibration of the vibration devices 1A and 1B. The vibration devices 1A and 1B appropriately give the tactile sensation to the user.

The protrusion 25 is intermittently provided in the vibration device 1B. In this case, the protrusion 25 tends not to inhibit the vibration of the vibration member 20. Therefore, the displacement of the vibration member 20 increases and the vibration device 1B more appropriately gives the tactile sensation to the user.

In the vibration devices 1A and 1B, the outer edge 25a and the inner edge 25b of the protrusion 25 are the wavy shape when viewed from the first direction D1.

The protrusion 25 may be damaged in a case where stress acts on the protrusion 25 from the vibration member 20 and the base 41. The stress acting from the vibration member 20 and the base 41 is dispersed in a case where the outer edge 25a and the inner edge 25b of the protrusion 25 are the wavy shape when viewed from the first direction D1. Therefore, the stress acting from the vibration member 20 and the base 41 tends not to concentrate on the protrusion 25. Consequently, the protrusion 25 tends not to be damaged in the vibration devices 1A and 1B.

The vibration devices 1A and 1B are disposed such that the protective layer 30 covers the piezoelectric element 10. Therefore, the protective layer 30 prevents moisture from infiltrating into the piezoelectric element body 11. Consequently, the vibration devices 1A and 1B reduces deterioration in the electrical characteristics of the piezoelectric element 10.

The wiring member 50 is not fixed to the operation panel 43. In other words, the vibration devices 1A and 1B are not fixed to the operation panel 43. In this case, the operation panel 43 tends not to inhibit the displacement of the vibration devices 1A and 1B. Therefore, the displacement of the vibration devices 1A and 1B tends not to decrease in the embodiment. Consequently, the vibration devices 1A and 1B more appropriately give the tactile sensation to the user.

Although the embodiment and modifications of the present invention have been described above, the present invention is not necessarily limited to the embodiment and modifications, and the embodiment can be variously changed without departing from the scope of the invention.

Although the protrusion 25 in the embodiment has the generally circular annular shape when viewed from the first direction D1, the shape of the protrusion 25 is not limited to the generally circular annular shape. The protrusion 25 may have a generally polygonal ring shape when viewed from the first direction D1. Although each part 26 in the present modification example has the generally arc shape when viewed from the first direction D1, the shape of each part 26 is not limited to the arc shape. Each part 26 may extend in a straight line shape, a wavy shape, or a zigzag shape when viewed from the first direction D1.

The shapes of the piezoelectric element body 11, the external electrodes 13 and 15, and the vibration member 20 are not limited to the shapes described above. For example, the piezoelectric element body 11, the external electrodes 13 and 15, and the vibration member 20 may have a polygonal shape in a plan view.

The piezoelectric element 10 may include one or more internal electrodes disposed in the piezoelectric element body 11. In this case, the piezoelectric element body 11 may include a plurality of piezoelectric layers and the internal electrodes and the piezoelectric layers may be alternately disposed.

A plurality of voids may be distributed in the protrusion 25 in a case where the protrusion 25 is made of resin.

The piezoelectric element 10 constitutes the detection element and the drive element. Alternatively, the piezoelectric element 10 may constitute the drive element without constituting the detection element.

The electronic device ED may include a display panel or a housing instead of the operation panel 43. In this case, the display panel and the housing constitute the vibrated member.

What is claimed is:

1. A vibration device arranged to be supported on a base and comprising:
    a piezoelectric element; and
    a vibration member that generates vibration, the vibration member having:
        a first main surface opposing the base;
        a second main surface opposing the first main surface, the piezoelectric element being disposed on the second main surface; and
        a protrusion of the first main surface, the protrusion being configured to contact the base and define a vibration space on the first main surface, and the protrusion being positioned outside the piezoelectric element to surround the piezoelectric element when the vibration member is seen through from a direction orthogonal to the first main surface.

2. The vibration device according to claim 1, wherein a thickness of the vibration space in the direction orthogonal to the first main surface is larger than displacement of the vibration member.

3. The vibration device according to claim 1, wherein the protrusion is disposed intermittently.

4. The vibration device according to claim 1, wherein the protrusion includes an edge having a wavy shape when viewed from the direction orthogonal to the first main surface.

5. The vibration device according to claim 1, further comprising a wiring member electrically connected to the piezoelectric element, wherein
    the second main surface of the vibration member has electrically conductivity,
    the piezoelectric element includes:
        a piezoelectric element body including a third main surface opposing the second main surface and a fourth main surface opposing the third main surface;
        a first electrode disposed on the third main surface and electrically connected to the second main surface; and
        a second electrode disposed on the fourth main surface, and
    the wiring member includes a line electrically connected to the second main surface and a line electrically connected to the second electrode.

6. The vibration device according to claim 1, wherein
    the piezoelectric element includes a piezoelectric element body and first and second electrodes on the piezoelectric element body,
    the piezoelectric element body includes a third main surface opposing the second main surface, a fourth main surface opposing the third main surface, and a side surface coupling the third main surface and the fourth main surface, and
    the side surface is exposed from the first electrode and the second electrode.

7. The vibration device according to claim 6, wherein
    the first electrode is disposed on the third main surface, and
    the second electrode is disposed on the fourth main surface.

8. The vibration device according to claim 6, wherein the piezoelectric element body is not in direct contact with the vibration member.

9. The vibration device according to claim 6, wherein an area of the second electrode is smaller than an area of the fourth main surface when viewed from a direction orthogonal to the fourth main surface.

10. The vibration device according to claim 6, wherein the second electrode is positioned inside an end edge of the fourth main surface when viewed from a direction orthogonal to the fourth main surface.

11. The vibration device according to claim 1, wherein the vibration member has electrically conductivity.

* * * * *